(12) United States Patent
Bosse et al.

(10) Patent No.: US 12,533,742 B2
(45) Date of Patent: Jan. 27, 2026

(54) DIRECTING APPARATUS FOR ORIENTING AN ARC OF AN ARC WELDING DEVICE FOR ARC WELDING USING A MAGNETICALLY MOVED ARC, AND USE OF THE DIRECTING APPARATUS

(71) Applicant: Endress+Hauser Flowtec AG, Reinach (CH)

(72) Inventors: Lüder Bosse, Birsfelden (CH); Simon Mariager, Basel (CH); Pierre-Jean Ober, Hagenthal-le-bas (FR); Werner Wohlgemuth, Seewen (CH)

(73) Assignee: Endress+Hauser Flowtec AG, Reinach (CH)

( * ) Notice: Subject to any disclaimer, the term of this patent is extended or adjusted under 35 U.S.C. 154(b) by 930 days.

(21) Appl. No.: 17/756,001

(22) PCT Filed: Nov. 9, 2020

(86) PCT No.: PCT/EP2020/081421
§ 371 (c)(1),
(2) Date: May 13, 2022

(87) PCT Pub. No.: WO2021/094233
PCT Pub. Date: May 20, 2021

(65) Prior Publication Data
US 2022/0388085 A1    Dec. 8, 2022

(30) Foreign Application Priority Data
Nov. 13, 2019   (DE) .......................... 102019130643.4

(51) Int. Cl.
*B23K 9/08*   (2006.01)
*B23K 9/167*   (2006.01)

(52) U.S. Cl.
CPC ................ *B23K 9/08* (2013.01); *B23K 9/167* (2013.01)

(58) Field of Classification Search
CPC ......... B23K 9/167; B23K 9/08; B23K 9/0737
See application file for complete search history.

(56) References Cited

U.S. PATENT DOCUMENTS

| | | |
|---|---|---|
| 2,809,278 A | 10/1957 | Persson |
| 4,027,135 A | 5/1977 | Barger |
| | (Continued) | |

FOREIGN PATENT DOCUMENTS

| | | |
|---|---|---|
| CA | 2083311 A1 | 7/1993 |
| CN | 102825364 A | 12/2012 |
| | (Continued) | |

OTHER PUBLICATIONS

Machine Translation of Hong (CN 102825364) performed on May 12, 2025. (Year: 2012).*

(Continued)

*Primary Examiner* — Brian W Jennison
(74) *Attorney, Agent, or Firm* — Christopher R. Powers; Endress+Hauser (USA) Holding, Inc.

(57) ABSTRACT

A directing apparatus for orienting an arc of an arc welding device for arc welding, in particular for TIG welding, using a magnetically moved arc, comprising: a retaining device having an opening for receiving a welding head of the arc welding device; one or more solenoid coils for forming a magnetic field for deflecting an arc generated by a welding device in the opening; and at least two bent pole shoes comprising at least two legs for focusing the magnetic field, a first of the legs of each pole shoe being affixed to the retaining device and/or to the solenoid coil and a second of the legs being oriented at an angle of less than 130° to the first leg.

16 Claims, 6 Drawing Sheets

(56) References Cited

U.S. PATENT DOCUMENTS

| | | | |
|---|---|---|---|
| 4,321,455 A | 3/1982 | Hill | |
| 6,617,547 B1 | 9/2003 | Abdurachmanov | |
| 2014/0151345 A1* | 6/2014 | Zelis | H05H 1/50 |
| | | | 219/121.48 |

FOREIGN PATENT DOCUMENTS

| | | |
|---|---|---|
| CN | 103781582 A | 5/2014 |
| CN | 104816079 A | 8/2015 |
| CN | 107745175 A | 3/2018 |
| CN | 109732183 A | 5/2019 |
| DE | 1615485 A1 | 6/1970 |
| DE | 2352842 A1 | 4/1975 |
| DE | 2602513 A1 | 7/1976 |
| DE | 2626825 A1 | 1/1977 |
| DE | 2805562 A1 | 8/1979 |
| DE | 0102323 A2 | 1/2002 |
| DE | 202008005534 U1 | 9/2009 |
| EP | 1649962 A1 | 4/2006 |
| JP | 58205679 A | 11/1983 |
| JP | 58205679 S | 11/1983 |
| JP | 2011224628 A | 11/2011 |
| JP | 5699087 B2 | 4/2015 |
| JP | 6099488 B2 | 3/2017 |
| JP | 6149776 B2 | 6/2017 |

OTHER PUBLICATIONS

Arc Products, MA-40, Magnetic Arc Control Operations and Service Manual, 0600-311 Rev. D, Sep. 2011.

* cited by examiner

DIRECTING APPARATUS FOR ORIENTING AN ARC OF AN ARC WELDING DEVICE FOR ARC WELDING USING A MAGNETICALLY MOVED ARC, AND USE OF THE DIRECTING APPARATUS

CROSS-REFERENCE TO RELATED APPLICATIONS

The present application is related to and claims the priority benefit of German Patent Application No. 102019130643.4, filed on Nov. 13, 2019, and International Patent Application No. PCT/EP2020/081421, filed Nov. 9, 2020, the entire contents of which are incorporated herein by reference.

TECHNICAL FIELD

The present invention relates to a directing apparatus for orienting an arc of an arc welding device for arc welding, in particular for TIG welding, using a magnetically moved arc according to the present disclosure, and to a use of the directing apparatus.

BACKGROUND

TIG welding is known as a variant of arc welding using a magnetically moved arc. The mode of operation of an arc welding device is known per se and is assumed to be technical knowledge in the context of the present invention. The arc can generate a plurality of electron charges. Since an arc has its own magnetic field, it responds to a magnetic field. It is therefore possible to deflect and orientate the arc by an external magnetic field.

FIGS. 5-7 disclose a variant of a directing apparatus according to the prior art for orienting an arc during a magnetically guided arc welding operation. The arc is generated within a tubular opening and exits the opening in the direction of a workpiece to be welded. Four pole shoes, which position an external magnetic field in the region of the arc, protrude from the housing of the directing apparatus. The magnetic field is generated by four electromagnets or solenoid coils, which are arranged symmetrically around the opening and are concealed by the housing of the directing apparatus in FIGS. 5-7. The magnetic field is then transmitted in each case to one or more pole shoes, which, depending on the strength of the respective magnetic field, deflect the arc more to the one or the other direction.

The problem here is that, with the directing apparatus shown in FIGS. 5-7, deflection is only very small, so that the solenoid coils were operated with a high operating current for deflection. This is neither an energy-efficient nor material-saving mode of operation.

Proceeding from the aforementioned prior art, it is the object of the present invention to develop the directing apparatus of FIGS. 5-7 in such a way that a stronger deflection of the arc takes place with the same use of energy, or a reduction in the use of energy takes place with the same deflection of the arc. Overall, the directing apparatus according to the invention allows for an optimized mode of operation compared to the known variant of FIGS. 5-7.

SUMMARY

The present invention achieves this object by a directing apparatus having the features of claim 1 the present disclosure.

A directing apparatus according to the invention serves to orientate an arc of an arc welding device for arc welding, in particular for TIG welding (tungsten inert gas welding), using a magnetically moved arc. The directing apparatus comprises:
i a retaining device having an opening for receiving a welding head of the arc welding device;
ii one or more solenoid coils for forming a magnetic field for deflecting an arc generated by an arc welding device in the opening; and
iii at least two bent pole shoes comprising at least two legs for focusing the magnetic field.

Here, a first of the legs of each pole shoe is affixed to the retaining device and/or to the solenoid coil and a second of the legs is oriented at an angle of less than 130° to the first leg.

The second leg can preferably have a terminal end face. Further segments of the pole shoe can be arranged between the first and the second leg; however, it is preferred if the first leg merges directly into the second leg.

The orientation of less than 130° means that the second leg is kinked by at least 50°. Particularly preferably, however, the orientation can be 125-115° and in particular 120°.

The kink of the pole shoe that is slightly stronger compared to the prior art has the surprising effect that the magnetic field strength is increased by at least 30%, but in particular by even 40-60%. The increase in the magnetic field strength is accompanied by a focusing of the magnetic field. The magnetic field strength is therefore focused at the location at which it is required for the deflection of the magnetic field.

Further advantageous embodiments are the subject of the dependent claims.

For better focusing, the second legs of two pole shoes are preferably directed toward one another.

For better control of the arc in four directions, it is advantageous if the directing apparatus has at least four pole shoes, wherein the second legs of the pole shoes are oriented to one another in such a way that a pole shoe is spaced apart from the adjacent pole shoe by less than 3 mm in each case, which additionally enables additional focusing.

Structural difficulties that can lead to a magnetic short circuit can advantageously be avoided if the gap has a certain size. An air gap of less than 5 mm between the pole shoes while maintaining the aforementioned basic condition is therefore particularly preferred.

To avoid losses in magnetic field, it is advantageous if the pole shoes have a uniform width along their longitudinal extension.

The pole shoes preferably have a thickness of at least 3 mm, preferably 4.5 to 6 mm.

For processing and conducting the magnetic field, the pole shoes are made of steel, preferably of a quality steel, particularly preferably of a steel with material number 1.0122 and/or 1.0038.

If the solenoid coil or the coil core is defective, it is advantageous if the solenoid coil comprises a coil former, in particular a plastic body. To form a corresponding magnetic field, it is expedient for the coil former to be wrapped with a wound wire, preferably with at least 450 turns. The solenoid coil has a coil core, which is arranged within the coil former. The use of a coil former also has advantages as regards heat dissipation and robustness of the solenoid coil.

The retaining device is tubular so as to be able to receive a welding head. At the upper end of the tube, it has a metallic, preferably magnetizable, annular disk, with recesses for the partially form-fitting holding of the pole shoes. A non-magnetizable annular disk can particularly preferably be arranged at the lower end of the tube, in order not to generate a magnetic short circuit.

The use of a directing apparatus according to the invention in an arc welding device for TIG welding using a magnetically moved arc is also according to the invention, wherein the deflection of the arc at an operating current of 1 A is at least 125 G, preferably at least 150 G, particularly preferably between 155 and 200 G.

It is advantageous if the arc welding device has a control unit that is oriented and connected to the solenoid coils in such a way that an individual actuation of the solenoid coils takes place. As a result, a much more extensive deflection and, in principle, a free movement can be achieved in any possible direction of the 2D plane during deflection of the arc.

BRIEF DESCRIPTION OF THE DRAWINGS

The invention is explained in more detail below with reference to an exemplary embodiment and in comparison with a prior art. The following are shown.

DETAILED DESCRIPTION

Figure 5:
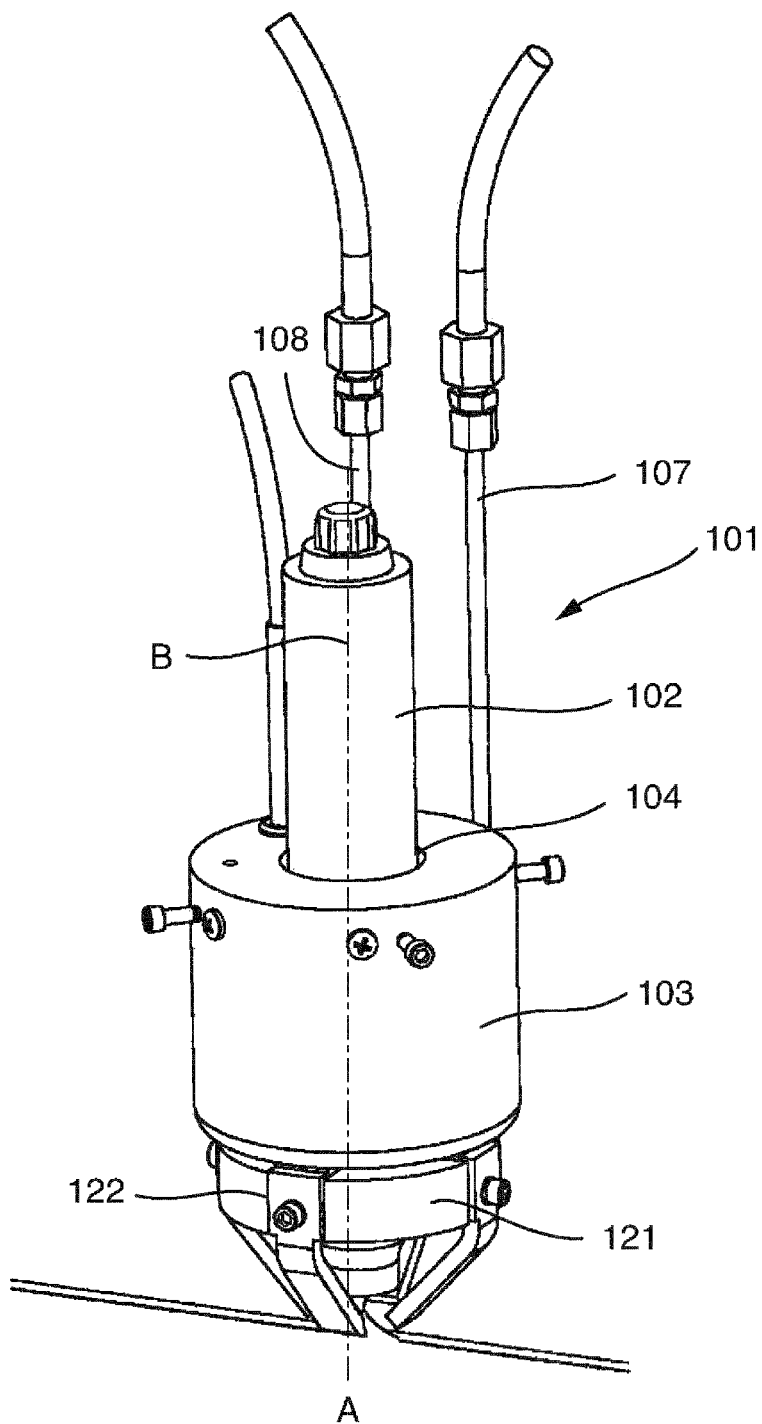
FIG. 5 shows a side view of part of an arc welding device according to the prior art.
Figure 6:
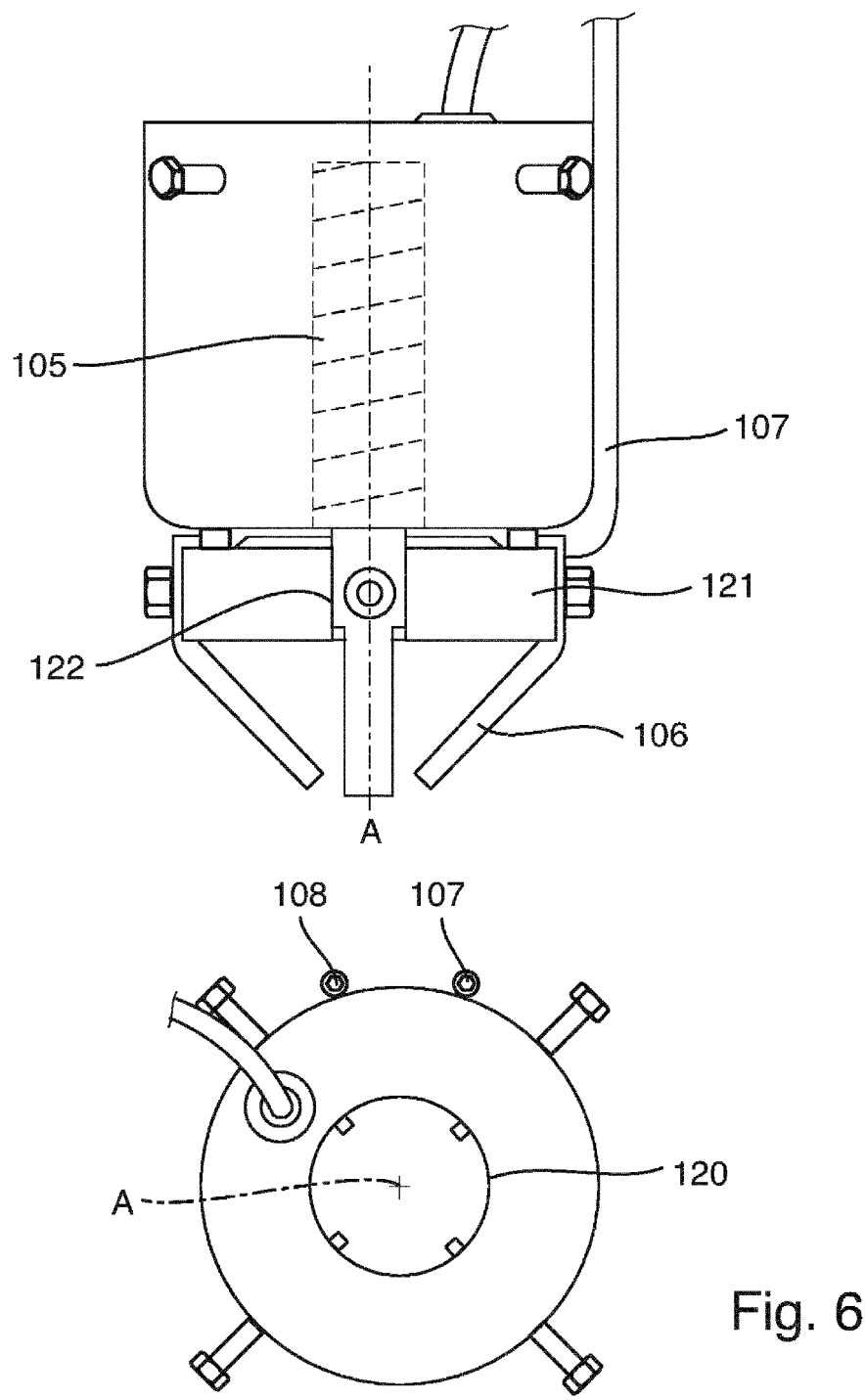
FIG. 6 shows a side view of a directing apparatus of the arc welding device of FIG. 5 for orienting an arc.
Figure 7:
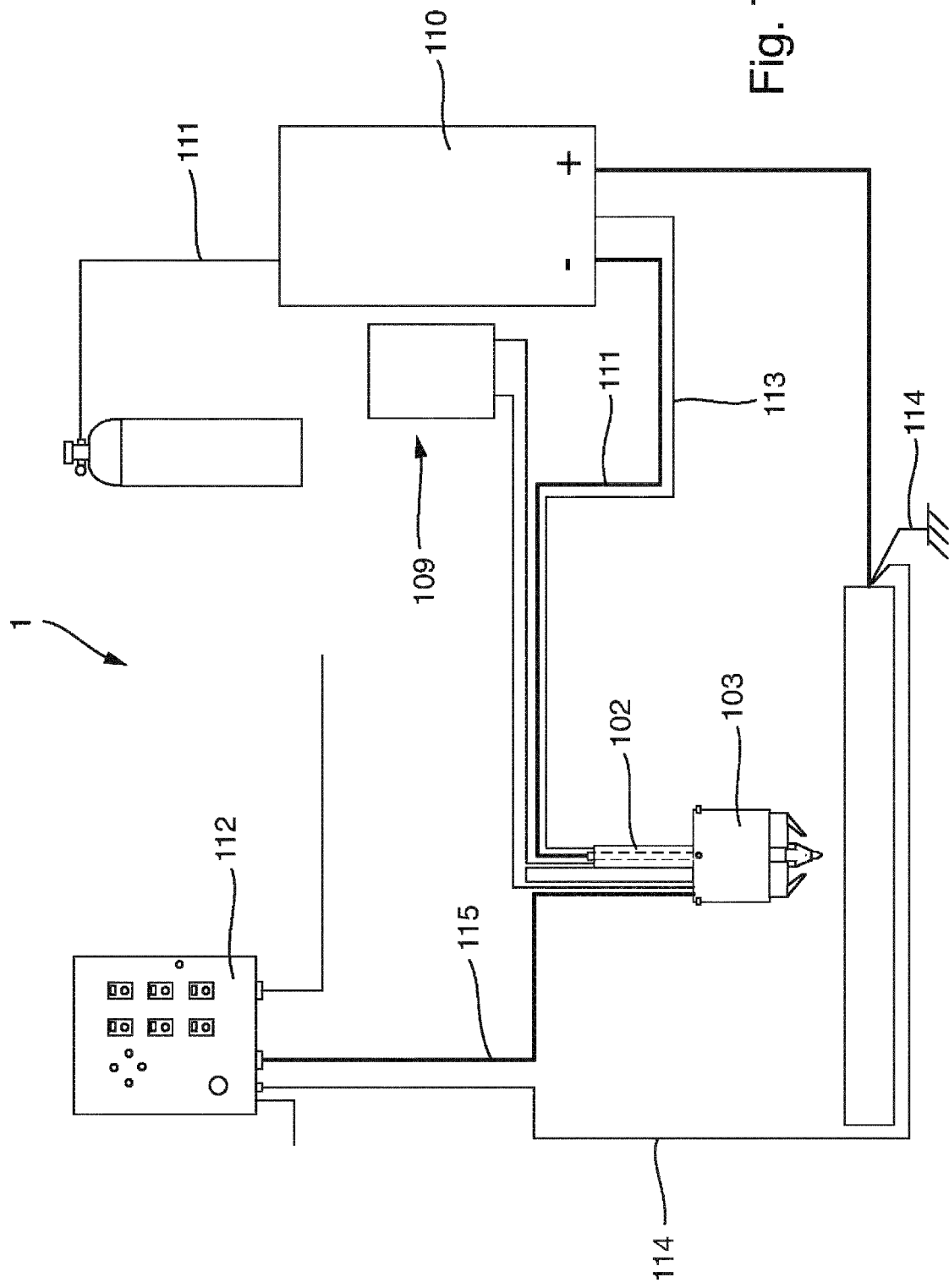
FIG. 7 shows a view of an arc welding process by means of the arc welding device according to FIGS. 5 and 6.

FIGS. 5-7 show an embodiment variant of an arc welding device 101 known per se. It is an arc welding device for TIG welding, i.e. for arc welding using a magnetically moved arc without a welding filler, according to EN ISO 4063: 2011-03 Main group 14, subgroups 142 (without addition)

Hollow profiles, among other things, are welded together with the method. For example, pipes of flow measuring devices can be provided with flanges or other process connections, whereby an arc is ignited between the joining part surfaces and is caused to move along the joining part edges in a magnetic field.

The electric arc is produced between the workpiece and an electrode made of tungsten. In contrast to other arc methods, the electrode used during TIG welding does not melt due to the high melting point of tungsten. The additional material is held in the arc in the form of wires or rods and thus melted. However, welding without additional material is also possible. In addition, as in all arc methods, the arc melts the base material. To prevent the melt from reacting with the ambient air, protective gases are used, which are inert, i.e., they do not engage in chemical reactions with the materials involved. The gases used are often argon or helium. Particularly high seam qualities can be achieved by TIG welding, but it is somewhat slower than the related metal inert gas welding (with consumable wire electrode).

The arc welding device 101 of FIGS. 5-7 has a rod-shaped torch or welding head 102 with a longitudinal axis B, which serves to generate and supply an arc. The welding head 102 is surrounded in regions by a directing apparatus 103, which is arranged substantially concentrically around the welding head. The directing apparatus 103 comprises a central tube-like opening 104 with a longitudinal axis A for inserting the welding head 102 into the directing apparatus, so that the longitudinal axis A and the longitudinal axis B lie on top of one another. A plurality of electromagnets 105 having the same radial distance from the longitudinal axis A are circumferentially distributed around the opening 104 for creating an external radial magnetic field. Due to the speed of the electron charge of the arc, a Lorentz force is generated with the external radial magnetic field generated by the electromagnets perpendicular to the direction of the arc current.

The following relationship applies:

$$F=qvB$$

This Lorentz force enables the arc to be guided, for example, along the joining edges of a hollow profile to be welded.

The electromagnets 105 are designed as solenoid coils with magnetic cores. The magnetic cores are arranged on a retaining device 120 and are connected to pole shoes 106 to orientate the magnetic field. The retaining device 120 can be designed as a tubular plastic body with terminal metallic magnetizable annular disks 121. One of the annular disks 121 has recesses 122 for receiving and/or positioning the pole shoes 106 in regions. By actuating the electromagnets 105 and by the subsequent conduction of the magnetic field through the pole shoes 106, the arc formed by the welding head can be deflected to a circular path. Furthermore, the directing apparatus 103 has a cooling supply and discharge line 107 and 108 as part of a cooling system 109, in order to dissipate the heat of the welding head.

FIG. 7 shows further components of the arc welding device 101, comprising a current source 110, a protective gas feed line 111 and a control unit 112, as well as further lines, in particular a power line 113, a grounding line 114, a signal transmission line 115.

Figure 8:
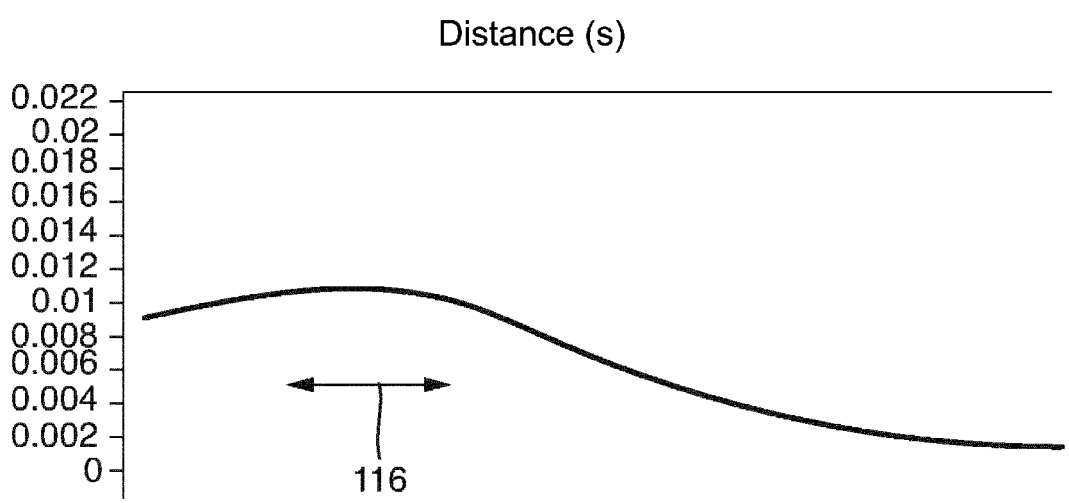
FIG. 8 shows a measurement of the magnetic field distribution in the axial length of the directing apparatus of the arc welding device of FIGS. 5-7.

FIG. 8 shows a diagram of a magnetic field strength in the region of the arc zone 116. At 1 A operating current, it has a value of 110 G. The deflection of the arc by the directing apparatus 103 of the arc welding device 101 is correspondingly low.

Figure 1:
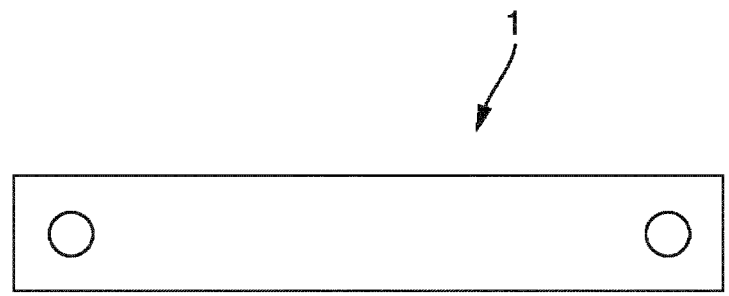
FIG. 1 shows a representation of a coil core.
Figure 2:
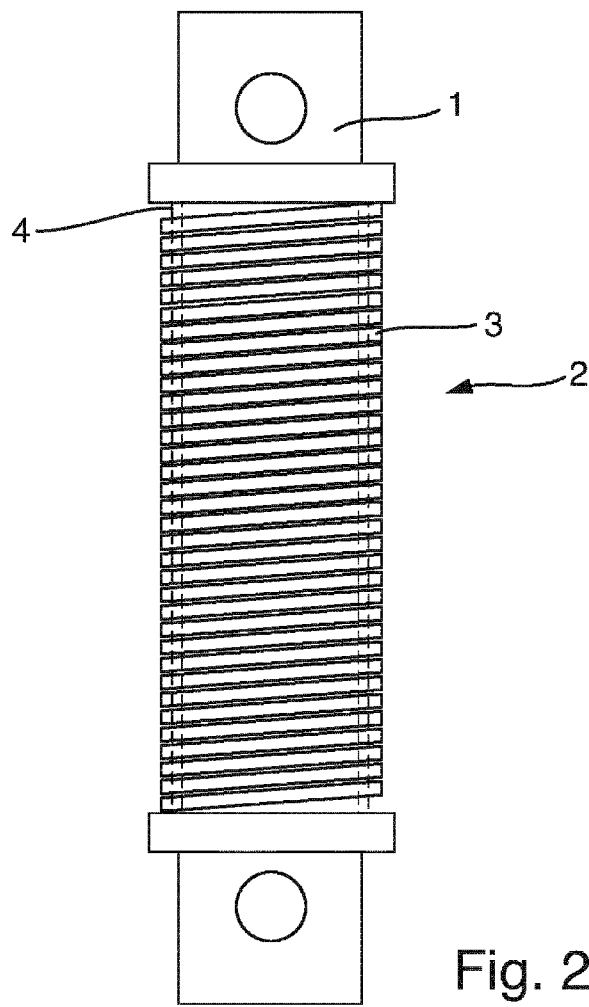
FIG. 2 shows a representation of a solenoid coil used within the scope of the present invention.
Figure 3:
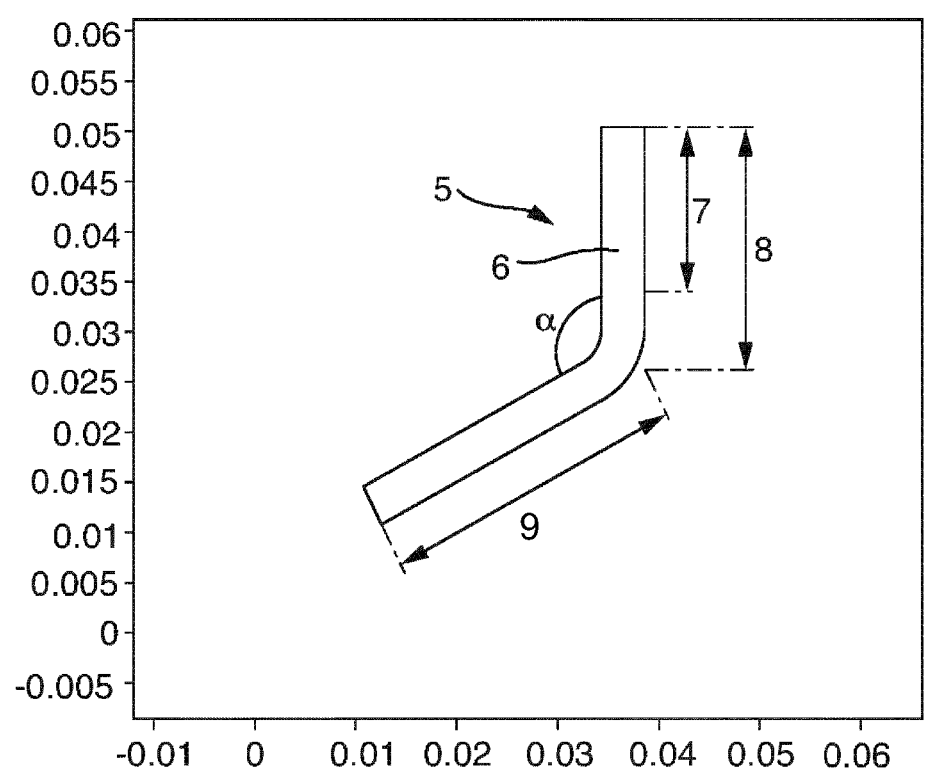
FIG. 3 shows an illustration of a pole shoe used within the scope of the present invention.
Figure 4:
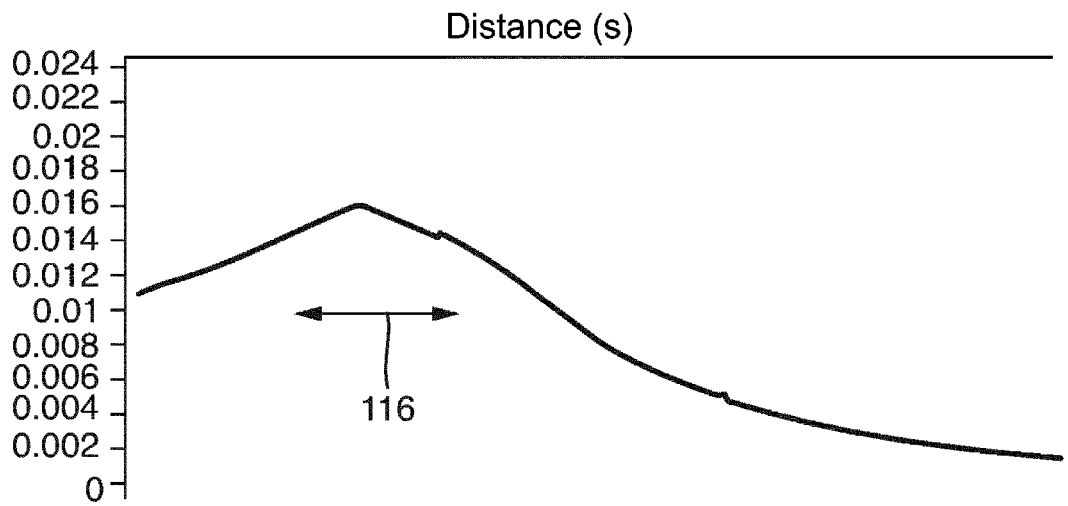
FIG. 4 shows a measurement of the magnetic field distribution in the axial length of the directing apparatus.

The directing apparatus 103 of the arc welding device shown in FIGS. 5-7 was modified by the components shown in FIGS. 1-3. These components are used in the directing apparatus 103, which otherwise is used unchanged.

FIG. 5 shows a coil core 1, comprising a plurality of guide plates that are combined to form the coil core 1. Metal with material number 1.0122 and/or 1.0038 can preferably be used as the core material. The length of the coil core is at least 10 cm.

FIG. 2 shows a solenoid coil 2, comprising the coil core 1 for use in the directing apparatus 103. In the solenoid coil of the prior art, a wire 3 around a paper-wrapped core was used.

In contrast to this, the solenoid coil 2 of the directing apparatus according to the invention now has a coil former 4 made of plastic. A wire with at least 500 turns was wound onto the coil former. As a result, the coil 2 and the coil core 1 can be replaced separately from one another, which is a great advantage when it comes to assembling the parts. Particularly preferably, the coil former can be made of polyoxymethylene (POM), which due to its mechanical stability and also thermal endurance is well suited for the application. For better heat formation, the coil wire 3 is wrapped with a high-temperature textile tape. The wire diameter is between 0.2 and 0.6 mm.

As can be seen in FIGS. 5-7, a total of four pole shoes and thus also four solenoid coils are provided in the directing apparatus 103 of the prior art. In the directing apparatus according to the invention, there are also four solenoid coils 2, which are arranged diametrically along a tubular plastic body, which comprises the opening for inserting the welding head. The tubular plastic body is provided with two annular disks at the end, wherein one of these annular disks is provided for holding the coil core 1 and the pole shoes 5.

In order to make it possible to weld small pipes, a special pole shoe 5 has been developed, which is bent by an angle α less than 130°, preferably by 115-125°, in particular by 120°, with respect to a linear orientation to form two legs 8 and 9. This is illustrated in FIG. 3.

To begin with, the pole shoe 5 of FIG. 3 has a first section 6 that runs parallel to the longitudinal axis B of the welding head 102 or of the opening 104.

The pole shoe 5 has a contact area 7 within the section 6, with which it rests on a retainer of the directing apparatus 103. Unlike in the prior art, however, the entire first section is at least 1.2 times, but in particular 1.3 to 2 times as long as the contact area 7. The thickness of the pole shoe is 5 mm. The width of the pole shoe is uniform over its entire length. This minimizes a loss of magnetic field.

Advantageously, the length of the legs 8 and 9 of the pole shoe is 1.2:1 to 1:1.2.

Surprisingly, a considerable and unexpected focusing of the magnetic field in the region of the arc could be achieved by the aforementioned structural changes. FIG. 3 shows the formation of the magnetic field to 160 G at 1 A operating current, whereby a stronger orientation of the arc can be achieved.

It is understood that the focusing of the magnetic field also makes it possible to achieve the same deflection of the arc as in FIGS. 5-8 at a lower operating current than in the prior art of FIGS. 5-8 at 1 A operating current.

As a result, a lower heating of the electromagnets takes place inter alia, as a result of which water cooling of the directing apparatus can advantageously be dispensed with. As a result, the directing apparatus can be additionally miniaturized.

The control of the orientation of the magnetic field and thus also of the arc can take place via the respective coil current of the electromagnets. However, while in the prior art of FIGS. 5-8 only the coils are coupled in pairs, an individual actuation of the respective coil takes place in the present invention. In the prior art, it was therefore only possible to form circular or elliptical welding paths, while even more complex welding paths can be formed with individual actuation. Instead of the control unit 113, a rotary potentiometer can be provided, which allows individual actuation with an individual current source of the respective solenoid coil 2.

REFERENCE SIGNS

1 Coil core
2 Solenoid coil
3 Coil wire
4 Coil former
5 Pole shoe
6 Portion
7 Contact region
8 First leg
9 Second leg
101 Arc welding device
102 Welding head/torch
103 Directing apparatus
104 Opening
105 Electromagnets
106 Pole shoes
107 Cooling supply line
108 Cooling discharge line
109 Cooling system
110 Power source
111 Protective gas feed line
112 Control unit
113 Power line
114 Grounding line
115 Signal transmission line
116 Arc zone
120 Retaining device
121 Annular disk
122 Recesses

The invention claimed is:

1. A directing apparatus for orienting an arc of an arc welding device configured for arc welding using a magnetically moved arc, the directing apparatus comprising:
a retaining device including an opening adapted to receive a welding head of the arc welding device;
a solenoid coil configured to generate a magnetic field as to deflect an arc generated by the arc welding device in the opening of the retaining device; and
at least two bent pole shoes comprising at least two legs configured to focus the magnetic field, wherein a first leg of each pole shoe is affixed to the retaining device and/or to the solenoid coil and a second leg of each pole shoe is oriented at an angle of less than 130° relative to the first leg.

2. The directing apparatus of claim 1, wherein the second legs of the at least two pole shoes are angled toward each other.

3. The directing apparatus of claim 1, wherein the directing apparatus comprises at least four bent pole shoes, wherein the second legs of each pole shoe are oriented to one another such that each pole shoe is spaced apart from an adjacent pole shoe by less than 3 mm.

4. The directing apparatus of claim 1, wherein each pole shoe has a uniform width along a longitudinal extension thereof.

5. The directing apparatus of claim 1, wherein each pole shoe has a thickness of at least 5 mm.

6. The directing apparatus of claim 1, wherein each pole shoe is made of steel.

7. The directing apparatus of claim 6, wherein each pole shoe is made of steel with material number 1.0122 and/or 1.0038.

8. The directing apparatus of claim 1, wherein the solenoid coil comprises a coil former, around which a wire is wound, and a coil core disposed inside the coil former.

9. The directing apparatus of claim 8, wherein the wound wire includes at least 450 turns of the wire.

10. The directing apparatus of claim 1, wherein the retaining device is tubular and includes an annular disk disposed at each end thereof, wherein a first of the annular disks is a magnetizable annular disk and a second of the annular disks is a non-magnetizable annular disk, wherein at least the non-magnetizable annular disk includes recesses configured to receive and hold the at least two pole shoes in an at least partially form-fitting manner.

11. The directing apparatus of claim 1, wherein the second leg of each pole shoe is oriented at an angle of 120° relative to the first leg.

12. The directing apparatus of claim 1, wherein the second leg of each pole shoe is oriented at an angle between 115° and 125° relative to the first leg.

13. A method of pressure welding using a magnetically moved arc, the method comprising:
   providing an arc welding device comprising the directing apparatus according to claim 11; and
   welding a workpiece using the arc welding device, wherein the magnetic field for deflection of the arc generated by the directing apparatus at an operating current of 1 A is at least 125 G in areas.

14. The method of claim 13, wherein the magnetic field is between 155 and 200 G in areas.

15. The method of claim 13, wherein the magnetic field is at least 150 G in areas.

16. The method of claim 13, wherein the directing apparatus comprises at least a second solenoid coil, and the arc welding device includes a control unit connected to each solenoid coil and configured such that each solenoid coil is individually actuated.

* * * * *